United States Patent
Windell

(10) Patent No.: US 9,712,413 B2
(45) Date of Patent: *Jul. 18, 2017

(54) SYSTEMS AND METHODS FOR MANAGING COMPUTING SYSTEMS UTILIZING AUGMENTED REALITY

(71) Applicant: GLOBALFOUNDRIES INC., Grand Cayman (KY)

(72) Inventor: David T. Windell, Raleigh, NC (US)

(73) Assignee: GLOBALFOUNDRIES INC., Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 14/976,530

(22) Filed: Dec. 21, 2015

(65) Prior Publication Data

US 2016/0110244 A1   Apr. 21, 2016

Related U.S. Application Data

(63) Continuation of application No. 14/249,619, filed on Apr. 10, 2014, now Pat. No. 9,219,665, which is a
(Continued)

(51) Int. Cl.
*G06F 15/173* (2006.01)
*H04L 12/26* (2006.01)
(Continued)

(52) U.S. Cl.
CPC ...... *H04L 43/0823* (2013.01); *G06F 11/0709* (2013.01); *G06F 11/079* (2013.01);
(Continued)

(58) Field of Classification Search
CPC    H04L 43/0817; H04L 29/08072; H04L 29/06
(Continued)

(56) References Cited

U.S. PATENT DOCUMENTS 6,148,337 A   11/2000  Estberg et al.
6,774,869 B2   8/2004  Biocca et al.
(Continued)

FOREIGN PATENT DOCUMENTS

CN        101101505 A     1/2008
DE    102008012122 A1     9/2009
(Continued)

OTHER PUBLICATIONS

Ahmad Kamil Abdul Hamid et al., "A Network Troubleshooting System Using Augmented Reality Technology," IPSJ SIG Technical Report, vol. 2010-UBI-26, No. 7, Information Processing Society of Japan, pp. 1-6, Jun. 15, 2010.
(Continued)

*Primary Examiner* — Razu A Miah
(74) *Attorney, Agent, or Firm* — David Cain; Hoffman Warnick LLC

(57) ABSTRACT

Various embodiments for managing computing systems are provided. In one embodiment, a method comprises comparing an identified target device in a captured environmental input to a model of the target device; recognizing, in real-time, a status condition of the target device based on the comparison; and determining if the target device is functioning properly if the target device and the model of the target device match, wherein if the target device is not functioning properly: a cause of error and troubleshooting instructions are displayed.

20 Claims, 5 Drawing Sheets

Related U.S. Application Data continuation of application No. 13/532,157, filed on Jun. 25, 2012, now Pat. No. 8,990,385, which is a continuation of application No. 13/082,298, filed on Apr. 7, 2011, now Pat. No. 8,738,754.

(51) Int. Cl.
*H04L 12/24* (2006.01)
*G06F 11/07* (2006.01)
*G06Q 10/10* (2012.01)
*G06T 19/00* (2011.01)
*G06K 9/00* (2006.01)
*G06K 9/62* (2006.01)

(52) U.S. Cl.
CPC ...... *G06F 11/0742* (2013.01); *G06F 11/0751* (2013.01); *G06F 11/0769* (2013.01); *G06F 11/0793* (2013.01); *G06K 9/00536* (2013.01); *G06K 9/00671* (2013.01); *G06K 9/6201* (2013.01); *G06Q 10/103* (2013.01); *G06T 19/006* (2013.01); *H04L 41/0654* (2013.01); *H04L 41/0686* (2013.01); *H04L 43/0817* (2013.01); *H04L 43/50* (2013.01); *G06K 2209/03* (2013.01); *G06T 2207/10004* (2013.01); *G06T 2207/30108* (2013.01); *G06T 2215/16* (2013.01)

(58) Field of Classification Search
USPC ........................................................ 709/224
See application file for complete search history.

(56) References Cited

U.S. PATENT DOCUMENTS

| | | | |
|---|---|---|---|
| 6,788,980 B1* | 9/2004 | Johnson | G05B 19/042 700/1 |
| 6,898,307 B1 | 5/2005 | Harrington | |
| 6,917,370 B2 | 7/2005 | Benton | |
| 7,110,909 B2 | 9/2006 | Friedrich et al. | |
| 7,215,322 B2* | 5/2007 | Genc | G06F 3/011 345/157 |
| 7,240,099 B2 | 7/2007 | Miyazaki et al. | |
| 7,372,451 B2* | 5/2008 | Dempski | G02B 27/017 345/158 |
| 7,907,901 B1 | 3/2011 | Kahn et al. | |
| 8,108,858 B2 | 1/2012 | Bantz et al. | |
| 8,301,785 B2 | 10/2012 | Jeong et al. | |
| 8,379,101 B2 | 2/2013 | Mathe et al. | |
| 8,516,489 B2 | 8/2013 | Laverone et al. | |
| 8,635,329 B2 | 1/2014 | Motoyama et al. | |
| 8,738,754 B2 | 5/2014 | Windell | |
| 8,843,635 B2 | 9/2014 | Oh et al. | |
| 2002/0009073 A1 | 1/2002 | Furukawa et al. | |
| 2002/0069037 A1 | 6/2002 | Hendrickson et al. | |
| 2003/0233458 A1* | 12/2003 | Kwon | H04L 29/06 709/227 |
| 2004/0008727 A1 | 1/2004 | See et al. | |
| 2004/0059808 A1* | 3/2004 | Galloway | G06N 5/02 709/224 |
| 2004/0113885 A1* | 6/2004 | Genc | G06F 3/011 345/156 |
| 2004/0212630 A1* | 10/2004 | Hobgood | G06F 3/011 345/633 |
| 2004/0218573 A1 | 11/2004 | Takahashi et al. | |
| 2006/0197973 A1* | 9/2006 | Castellani | G06K 15/00 358/1.14 |
| 2006/0218321 A1* | 9/2006 | Hotta | G06F 13/4291 710/62 |
| 2006/0227998 A1* | 10/2006 | Hobgood | G06T 7/70 382/103 |
| 2006/0271658 A1* | 11/2006 | Beliles, Jr. | G08B 25/08 709/223 |
| 2006/0271675 A1 | 11/2006 | Wakazono et al. | |
| 2006/0282529 A1 | 12/2006 | Nordin | |
| 2007/0024527 A1* | 2/2007 | Heikkinen | A63F 13/52 345/9 |
| 2007/0033279 A1 | 2/2007 | Battat et al. | |
| 2007/0063841 A1* | 3/2007 | Babich | G08B 13/191 340/545.1 |
| 2007/0093955 A1 | 4/2007 | Hughes | |
| 2007/0132785 A1* | 6/2007 | Ebersole | A63F 13/06 345/633 |
| 2007/0139529 A1 | 6/2007 | Levien et al. | |
| 2007/0274563 A1 | 11/2007 | Jung et al. | |
| 2008/0008202 A1 | 1/2008 | Terrell et al. | |
| 2008/0043108 A1 | 2/2008 | Jung et al. | |
| 2008/0049627 A1 | 2/2008 | Nordin | |
| 2008/0175190 A1 | 7/2008 | Lee et al. | |
| 2009/0086269 A1 | 4/2009 | Nakajima | |
| 2009/0102859 A1 | 4/2009 | Athsani et al. | |
| 2009/0167509 A1 | 7/2009 | Fadell et al. | |
| 2009/0167787 A1* | 7/2009 | Bathiche | A63F 13/10 345/633 |
| 2009/0167919 A1 | 7/2009 | Anttila et al. | |
| 2010/0005156 A1 | 1/2010 | Wesby | |
| 2010/0030493 A1 | 2/2010 | Rao | |
| 2010/0115417 A1 | 5/2010 | Cox et al. | |
| 2010/0142447 A1 | 6/2010 | Schlicht et al. | |
| 2010/0142448 A1 | 6/2010 | Schlicht et al. | |
| 2010/0177750 A1 | 7/2010 | Essinger et al. | |
| 2010/0238194 A1 | 9/2010 | Roach, Jr. | |
| 2010/0271951 A1* | 10/2010 | Dujardin | H04L 63/0272 370/241 |
| 2010/0313145 A1 | 12/2010 | Dillenberger et al. | |
| 2011/0055049 A1 | 3/2011 | Harper et al. | |
| 2011/0082936 A1 | 4/2011 | Breslin et al. | |
| 2011/0113350 A1 | 5/2011 | Carlos | |
| 2011/0148924 A1 | 6/2011 | Tapley et al. | |
| 2011/0173323 A1 | 7/2011 | Fimbel et al. | |
| 2011/0201362 A1 | 8/2011 | Bregman-Amitai et al. | |
| 2011/0208822 A1 | 8/2011 | Rathod | |
| 2011/0254671 A1 | 10/2011 | Okimoto et al. | |
| 2011/0270963 A1 | 11/2011 | Saito et al. | |
| 2012/0007852 A1 | 1/2012 | Morate et al. | |
| 2012/0025974 A1 | 2/2012 | Richey et al. | |
| 2012/0025975 A1 | 2/2012 | Richey et al. | |
| 2012/0025976 A1* | 2/2012 | Richey | H04W 4/023 340/539.13 |
| 2012/0026530 A1* | 2/2012 | Tsongas | H04N 1/00307 358/1.14 |
| 2012/0105447 A1* | 5/2012 | Kim | H04N 21/42226 345/419 |
| 2012/0113285 A1 | 5/2012 | Baker et al. | |
| 2012/0114297 A1* | 5/2012 | Adhikari | G06Q 30/0623 386/224 |
| 2012/0131575 A1 | 5/2012 | Yehuda et al. | |
| 2012/0173069 A1 | 7/2012 | Tsimhoni et al. | |
| 2012/0249588 A1 | 10/2012 | Tison et al. | |
| 2012/0256953 A1 | 10/2012 | Meserth et al. | |
| 2012/0257794 A1 | 10/2012 | Meserth et al. | |
| 2012/0259973 A1 | 10/2012 | Windell | |
| 2012/0265876 A1 | 10/2012 | Windell | |
| 2013/0120449 A1 | 5/2013 | Ihara et al. | |
| 2013/0128042 A1 | 5/2013 | Bridge et al. | |
| 2014/0218398 A1 | 8/2014 | Windell | |
| 2014/0218399 A1 | 8/2014 | Windell | |
| 2015/0082102 A1 | 3/2015 | Windell | |

FOREIGN PATENT DOCUMENTS

| | | |
|---|---|---|
| JP | 201061569 A | 3/2010 |
| JP | 2010165321 A | 7/2010 |
| JP | 2010219879 A | 9/2010 |
| WO | 2007066166 A1 | 6/2007 |

(56) References Cited

FOREIGN PATENT DOCUMENTS

WO   WO2010113466 A1   10/2010
WO      2011135968 A1   11/2011

OTHER PUBLICATIONS

Loo et al., "Declarative Networking," ACM Digital Library, vol. 52, No. 11, pp. 87-95, Nov. 2009.
Schoening et al., "Improving the communication of spatial information in crisis response by combining paper maps and mobile devices," INSPEC/Springer 2009, pp. 57-65.

* cited by examiner

10

SYSTEMS AND METHODS FOR MANAGING COMPUTING SYSTEMS UTILIZING AUGMENTED REALITY

CROSS-REFERENCE TO RELATED APPLICATIONS

This Application is a Continuation of U.S. patent application Ser. No. 14/249,619, filed on Apr. 10, 2014, now U.S. Pat. No. 9,219,665, issued Dec. 12, 2015, which is a Continuation of U.S. patent application Ser. No. 13/532,157, filed Jun. 25, 2012, now U.S. Pat. No. 8,990,385, issued Mar. 24, 2015, which is a Continuation of U.S. patent application Ser. No. 13/082,298, filed on Apr. 7, 2011, now U.S. Pat No. 8,738,754, issued May 27, 2014.

BACKGROUND OF THE INVENTION

Field of the Invention

The present invention relates generally to computing systems, and more particularly to, systems and methods for managing computing systems utilizing augmented reality.

Description of the Related Art

Augmented reality is utilized primarily to passively obtain information regarding a particular location identified in a captured image. For example, a user can obtain the menu of a particular restaurant via augmented reality utilizing a captured image of the restaurant. In this example, a captured image of the exterior of the restaurant is used to identify the restaurant. Once the restaurant is identified, a user is capable of obtaining previously stored information related to the restaurant (e.g., the menu, consumer rating, location, etc.). While obtaining information via augmented reality is helpful in many situations, contemporary uses of augmented reality are limited.

For example, field technicians are often required to inspect computing systems to determine if the computing systems are functioning properly. If a computing system is experiencing an error condition, the field technician usually diagnoses the one or more causes of the error condition and then troubleshoots the error condition. Often, the field technician accesses a management network to determine the error condition and/or to access an error log for the computer system(s) that is/are experiencing an error condition. At times, however, the field technician may not be able to access the management network because, for example, the device the field technician is utilizing to access the management network may be malfunctioning and/or the management network may not be functioning properly. Alternatively, the field technician may not be associated with the entity in charge of the management network and, for security reasons, the entity in charge of the management network does not desire to provide the field technician with access to the management system. Therefore, it is desirable for a field technician to have a way to remotely determine the status condition of a computing systems and diagnose/troubleshoot errors in the computing system without accessing the management network.

SUMMARY OF THE INVENTION

Various embodiments for managing computing systems are provided. In one embodiment, a method comprises comparing an identified target device in a captured environmental input to a model of the target device; recognizing, in real-time, a status condition of the target device based on the comparison; and determining if the target device is functioning properly if the target device and the model of the target device match, wherein if the target device is not functioning properly: a cause of error and troubleshooting instructions are displayed.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide systems and methods for managing computing systems. Also provided are physical computer storage mediums (e.g., an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) comprising a computer program product method for managing computing systems.

Figure 1:
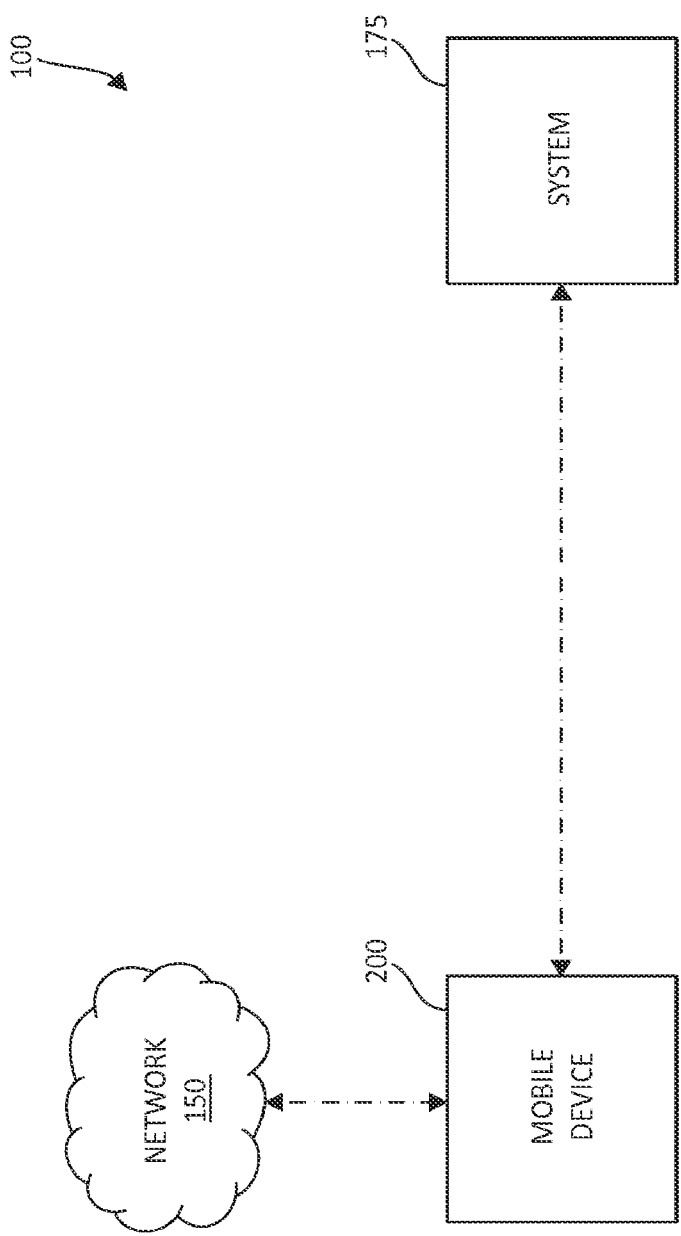
FIG. 1 is a block diagram of one embodiment of a system for managing computing systems.

Turning now to the figures, FIG. 1 is a block diagram of one embodiment of a system 100 for managing computing systems. At least in the illustrated embodiment, system 100 comprises a mobile device 200 configured to communicate with a network 150 (e.g., the Internet, a wide area network (WAN), a local area network (LAN), and the like networks) and system 175, which system may be external to and/or included as a portion of system 100.

System 175 may be any type of computing system and/or computing device. In one embodiment, system 175 comprises one or more sub-devices 1752 (e.g., one or more servers, one or more storage devices, one or more power supplies, one or more blade chassis, etc.).

In various embodiments, each of the one or more sub-devices 1752 in system 175 comprises an identifier 1754, which may be any type of identifier known in the art or developed in the future. In one embodiment, each identifier 1754 is a bar code or other type of alphanumeric identifier. In another embodiment, each identifier 1754 is a radio frequency identifier (RFID) device (e.g., a RFID tag). In yet another embodiment, the location of the each respective computing device 1752 is the identifier 1754 for each computing device 1752. In this embodiment, the location may be with respect to a fixed object, with respect to the environment within each computing device 1752 resides, and/or with respect to a global position of each computing device. In still another embodiment, the shape, color, size, and/or other physical characteristic of each computing device 1752 is the identifier 1754 for each respective computing device 1752. In an alternative embodiment, a sound, noise, and/or other auditory cue generated by each respective computing device 1752 is the identifier 1754 for each respective computing device 1752. In yet another alternative embodiment, a vibration, a motion, and/or other tactile cue generated by each respective computing device 1752 is the identifier 1754 for each respective computing device 1752.

Each identifier 1754, in one embodiment, is the same type of identifier. For example, each identifier may be a bar code or other alphanumeric identifier that uniquely distinguishes each computing device 1752. In another embodiment, at least two sub-devices 1752 include different types of identifiers 1754. For example, a first identifier 1754 on a first computing device 1752 may be a bar code and a second identifier 1754 for a second computing device 1752 may be the global position of the second computing device. Regardless of the type of identifier 1754, mobile device 200 is capable of capturing an environmental input including the identifier 1754.

Figure 2:
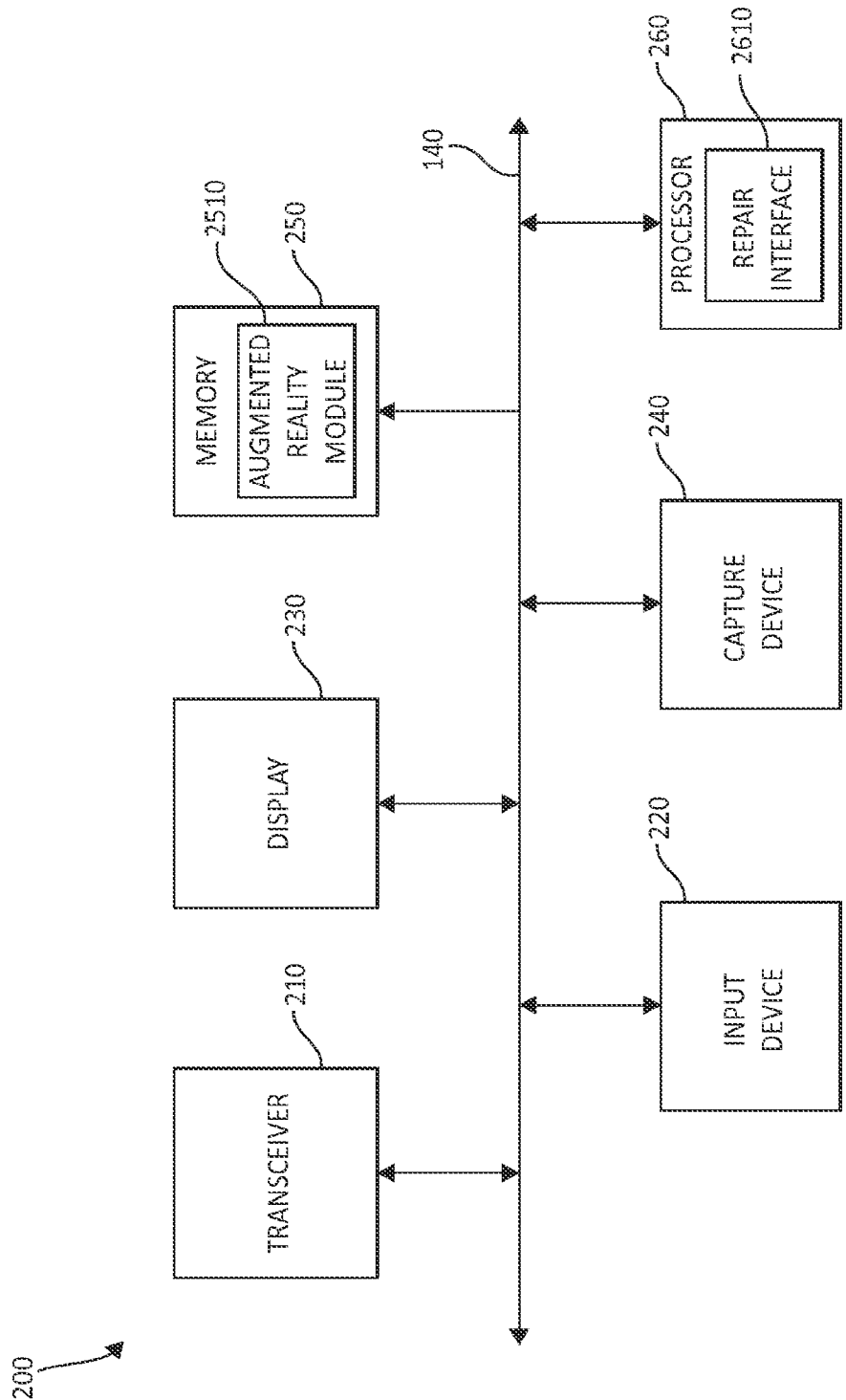
FIG. 2 is a block diagram of one embodiment of a mobile device utilized in the system of FIG. 1.

With reference now to FIG. 2, FIG. 2 is a block diagram of one embodiment of mobile device 200 utilized in system 100 of FIG. 1. At least in the illustrated embodiment, mobile device 200 comprises a transceiver 210, one or more input devices 220, a display 230, one or more capture devices 240, a memory 250, and a processor 260 coupled to one another via a bus 270 (e.g., a wired and/or wireless bus).

Transceiver 210 may be any system and/or device capable of communicating (e.g., transmitting and receiving data and/or signals) with a network (e.g., network 150). As such, transceiver 210 may be any transceiver known in the art or developed in the future.

Input device(s) 220 may be any system and/or device capable of receiving input from a user. Examples of input devices 220 include, but are not limited to, a mouse, a keyboard, a microphone, a touch screen, and the like input devices. As such, input device(s) 220 may be input device known in the art or developed in the future. In the various embodiments, each input device 220 is in communication with display 230.

Display 230 may be any system and/or device capable of displaying data. As such, display 230 may be any display known in the art or developed in the future. In one embodiment, display 230 includes a touch screen such that display 230 and input device 220 are integrated devices. In various embodiments, display 230 is configured to display data received from network 150, input device(s) 230, and one or more capture devices 240.

Capture device(s) 240 may be any system and/or device capable of capturing environmental inputs (e.g., visual inputs, audio inputs, and tactile inputs). Examples of capture devices 240 include, but are not limited to, a camera, a microphone, a global positioning system (GPS), a gyroscope, a plurality of accelerometers, and the like capture devices. As such, capture device(s) 240 may be any capture device known in the art of developed in the future. In one embodiment, capture device 240 is a camera configured to capture images of the environment surrounding mobile device 200.

Memory 250 may be any system and/or device capable of storing data. In one embodiment, memory 250 stores computer code comprising an augmented reality module 2510. Augmented reality module 2510 comprises instructions that, when executed by processor 260, causes processor 260 to perform a method of managing system 175.

Processor 260 is configured to execute the computer code comprising augmented reality module 2510. When executing augmented reality module 2510, processor 260 is configured to receive and process a captured environmental input representing at least a portion of system 175 from capture device 240.

In processing the captured environmental input, processor 260 is configured to identify one or more target devices in system 175 that are represented in the captured environmental input. For example, if the captured environmental input is an image of at least a portion of system 175, processor 260 is configured to identify one or more target devices in the captured image.

Processor 260 is configured to identify each target device utilizing the identifier 1754 for each respective target device. For example, in a captured image of system 175, processor 260 is configured to identify each target device via a bar code and/or other visual cue(s). In another example, in a captured audio clip of system 175, processor 260 is configured to identify each target device via a sound, noise, and/or other audio cue(s). In still another example, in a captured tactile bit of system 175, processor 260 is configured to identify each target device via a motion, vibration, and/or other tactile cue(s).

After the target device(s) is/are identified, processor 260 is configured to compare each identified target device with a model of the respective target device. The comparison is utilized to determine, in real-time, a status condition (e.g., functioning properly, experiencing a warning condition, experiencing an error condition, etc.). Specifically, if the captured target device and the model match, the target device is functioning properly. If the captured target device and the model do not match, processor 260 is configured to determine that the target device is experiencing a warning condition and/or an error condition (i.e., is not functioning properly) and is further configured to recognize the type of error that is occurring in the target device. That is, processor 260 is configured to recognize an indicator (e.g., a light, a screen message, a sound, a vibration, a lack of a visual cue, etc.) in the captured environmental input and associate a particular error condition with the indicator. For example, processor 260 may be configured to recognize in a captured image that a power indicator light is "OFF" and associate a power failure with such condition.

Figure 3:
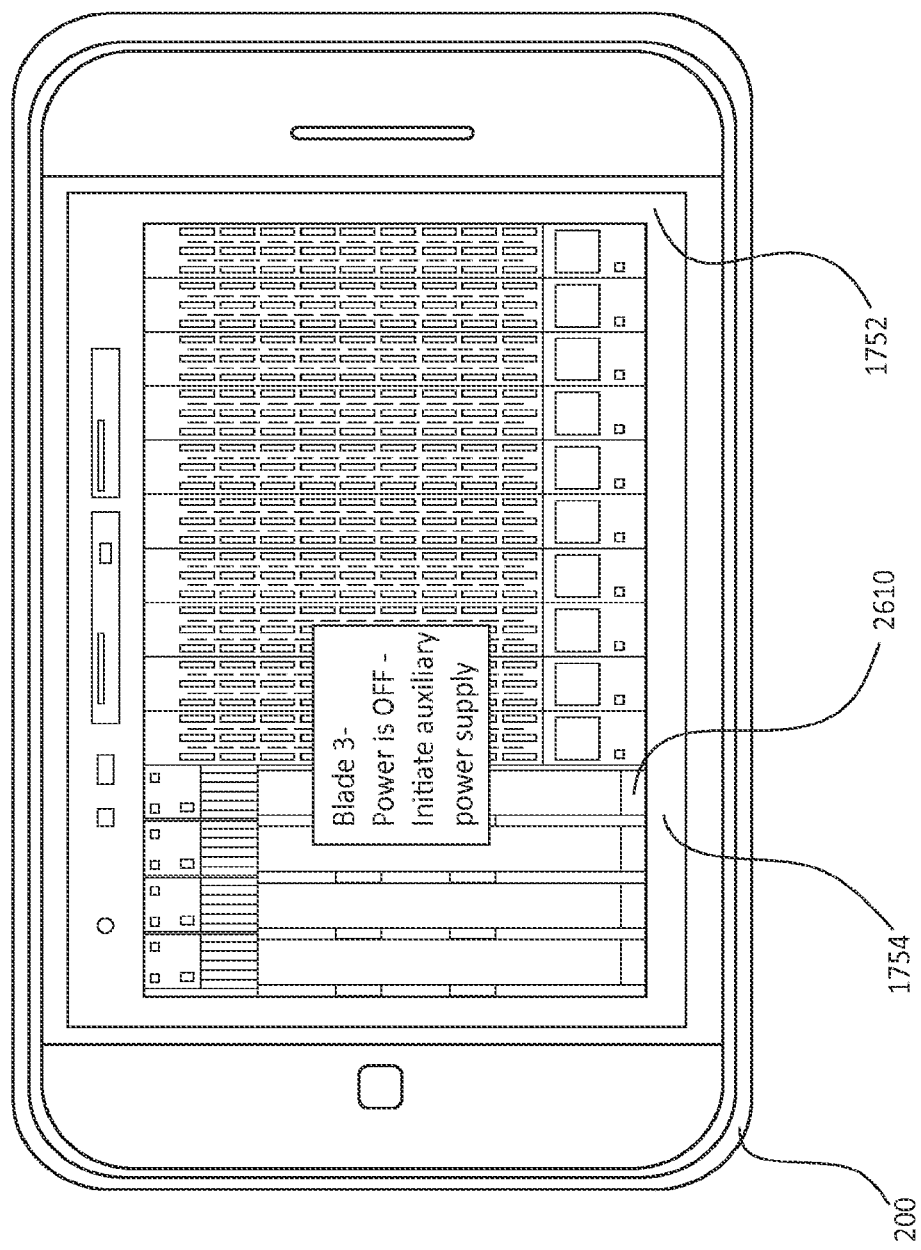
FIG. 3. is a diagram of one embodiment of a repair interface included within the mobile device of FIG. 2.

In one embodiment, processor 260 is further configured to utilize a repair interface 2610 to determine one or more causes of the determined error condition after the one or more error conditions have been identified. In response thereto, processor 260 is configured to display (e.g., overlay) the error condition (see e.g., FIG. 3), possible cause(s) of the determined error condition, one or more possible solutions to the error condition, and/or instructions for troubleshooting the error condition to the user.

In another embodiment, processor is configured to query, via transceiver 210, network 150 (e.g., the Internet) regarding the error condition. Processor 260 is further configured to receive one or more possible causes of the determined error condition, one or more solutions to the error condition, and/or instructions for troubleshooting the error condition. In response thereto, processor 260 is configured to display, via display 230, the possible cause(s) of the determined error condition, the one or more solutions to the error condition, and/or instructions for troubleshooting the error condition to the user.

In continuing with the example above, if the power indicator is "OFF," processor 260 will determine the reason the power is "OFF" on the target device. In this example, repair interface 2610 or the data received from network 150 may indicate that the main power supply is experiencing problems and/or present a error log and instruct processor 260 to display the problem and/or error log to the user. Processor 260 will then display the problem and/or error log on display 230 and launch repair interface 2610 so that the user is able to address the fault condition.

In further continuation to the above example, the user may be instructed by repair interface 2610 to initiate an auxiliary power supply to the target device. In response thereto, the user may then be able to manually initiate the auxiliary power supply to correct the determined error condition.

In one embodiment, mobile device 200 is a cellular telephone (e.g., a "smart" phone). In other embodiments, mobile device 200 is a computing tablet, a notebook computing device, a netbook computing device, a laptop computing device, and/or the like computing device.

Figure 4:
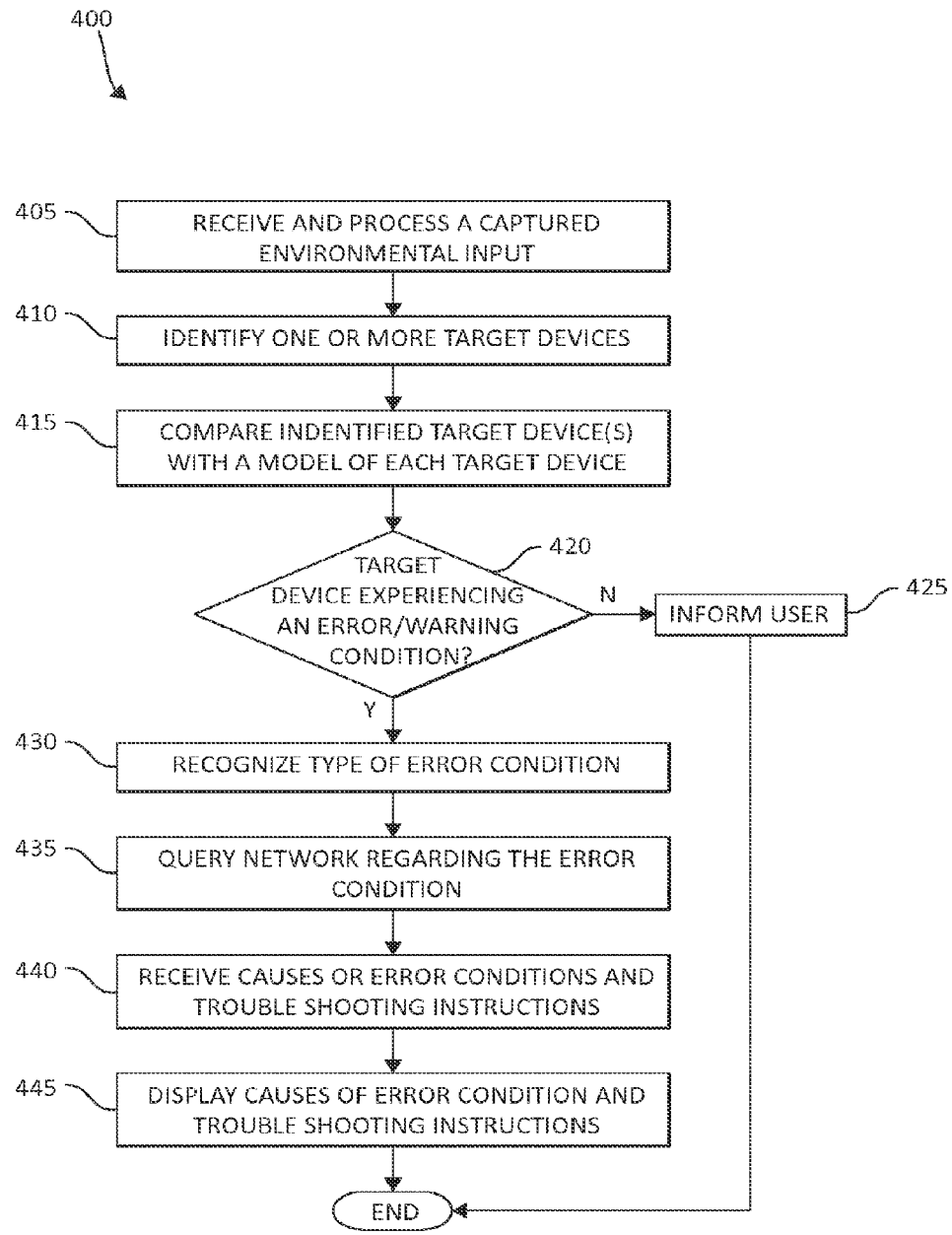
FIG. 4 is a flow diagram of one embodiment of a method for managing computing systems utilizing augmented reality.

Turning now to FIG. 4, FIG. 4 is a flow diagram of one embodiment of a method 400 for managing a system (e.g., system 100) utilizing augmented reality. At least in the illustrated embodiment, method 400 starts by a processor (e.g., processor 260) receiving and processing a captured environmental input representing at least a portion of a system (e.g., system 175) from a capture device (e.g., capture device 240) (block 405).

In processing the captured environmental input, method 400 comprises identifying one or more target devices in the system that are represented in the captured environmental input (block 410). In one embodiment, method 400 utilizes a captured image of the system to identify each target device. In another embodiment, method 400 utilizes a captured audio clip of the system to identify each target device. In still another embodiment, method 400 utilizes a captured tactile bit of the system to identify each target device.

After the target device(s) is/are identified, method 400 comprises comparing each identified target device with a model of the respective target device (block 415) and determines, in real-time, if the target device is experiencing a fault condition or other abnormality (block 420). If the captured target device is not experiencing a fault condition or other abnormality (i.e., is functioning properly), method 400 comprises providing an indication to a user that the target device is functioning properly (block 425) and method 400 ends.

If the captured target device is not functioning properly, method 400 comprises recognizing the type of fault that is occurring in the target device (block 430). Method 400 further comprises querying a network (e.g., network 150) regarding the cause of the determined error condition after the one or more fault conditions have been determined (block 435).

Method 400 further comprises receiving from the network one or more causes of the fault condition and troubleshooting instructions for repairing the error condition (block 440). In response thereto, method 400 comprises displaying, via a display (e.g., display 230), the one or more causes of the error condition and the troubleshooting instructions received from the network (block 445). Method 400 then ends.

Figure 5:
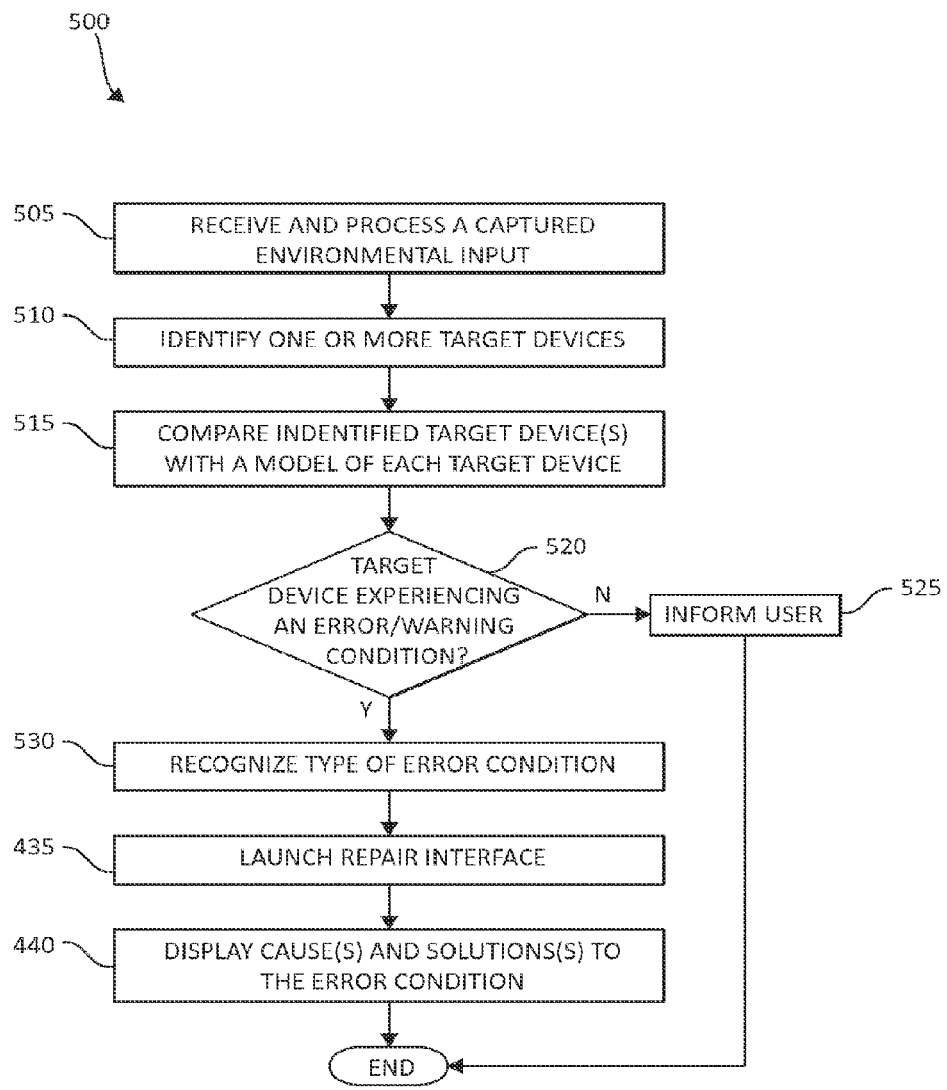
FIG. 5 is a flow diagram of another embodiment of a method for managing computing systems utilizing augmented reality.

With reference now to FIG. 5, FIG. 5 is a flow diagram of another embodiment of a method 500 for managing a system (e.g., system 100) utilizing augmented reality. At least in the illustrated embodiment, method 500 starts by a processor (e.g., processor 260) receiving and processing a captured environmental input representing at least a portion of a system (e.g., system 175) from a capture device (e.g., capture device 240) (block 505).

In processing the captured environmental input, method 500 comprises identifying one or more target devices in the system that are represented in the captured environmental input (block 510). In one embodiment, method 500 utilizes a captured image of the system to identify each target device. In another embodiment, method 500 utilizes a captured audio clip of the system to identify each target device. In still another embodiment, method 500 utilizes a captured tactile bit of the system to identify each target device.

After the target device(s) is/are identified, method 500 comprises comparing each identified target device with a model of the respective target device (block 515) and determines, in real-time, if the target device is experiencing a fault condition or other abnormality (block 520). If the captured target device is not experiencing a fault condition or other abnormality (i.e., is functioning properly), method 500 comprises providing an indication to a user that the target device is functioning properly (block 525) and method 500 ends.

If the captured target device is not functioning properly, method 500 comprises recognizing the type of error that is occurring in the target device (block 530). Method 500 further comprises launching a repair interface (e.g., repair interface 2610) to determine the cause of the determined error condition and one or more possible solutions to the error condition (block 535).

After the repair interface has determined the one or more causes and the one or more solutions to the determined error condition, method 500 comprises displaying, via a display (e.g., display 230), the one or more causes of the error condition and the one or more possible solutions to the error condition (block 540). Method 500 then ends.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A method for managing computing systems utilizing augmented reality using a processor, comprising:
   capturing an environmental input;
   identifying a target device in the captured environmental input, the target device including at least one identifier included in the captured environmental input;
   comparing the identified target device in the captured environmental input to a model of the target device;
   recognizing, in real-time, a status condition of the identified target device based on the comparison; and
   determining if the identified target device is functioning properly if the identified target device and the model of the target device match, wherein if the identified target device is not functioning properly, performing actions including:
      recognizing at least one indicator of the identified target device, and
      displaying a cause of error and troubleshooting instructions, based on the at least one indicator of the identified target device.

2. The method of claim 1, wherein identifying the target device comprises identifying the target device via one of a bar code, a radio frequency identifier, and a position of the target device.

3. The method of claim 1, further comprising a display coupled to the processor, the method further comprising displaying, via the display, the information regarding the status condition.

4. The method of claim 3, wherein displaying information regarding the status condition comprises displaying the troubleshooting instructions if the status condition is the error condition.

5. The method of claim 1, wherein capturing the environmental input comprises capturing the environmental input utilizing one of an audio capturing device, a visual capturing device, and a tactile capturing device.

6. The method of claim 1, wherein capturing the environmental input comprises capturing a static visual image of the target device utilizing a camera.

7. The method of claim 1, wherein capturing the environmental input comprises capturing video images of the target device utilizing a camera.

8. The method of claim 1, wherein the at least one indicator includes a power indicator light in the captured environmental input.

9. The method of claim 1, wherein the at least one indicator includes a vibration in the captured environmental input.

10. The method of claim 1, wherein the at least one indicator includes a screen message in the captured environmental input.

11. The method of claim 1, wherein the at least one indicator includes a sound in the captured environmental input.

12. The method of claim 1, wherein the at least one indicator includes a lack of a visual cue in the captured environmental input.

13. The method of claim 1, further comprising automatically querying a network regarding the cause of error in response to determining that the target device is not functioning properly.

14. The method of claim 13, wherein the cause of error and the troubleshooting instructions are received in response to querying the network.

15. A method for managing computing systems utilizing augmented reality using a processor, comprising:
   capturing an environmental input;
   identifying a target device in the captured environmental input, the target device including at least one identifier included in the captured environmental input;
   determining whether the identified target device matches a model of the target device;
   in response to the identified target device matching the model of the target device, determining that the identified target device is functioning properly; and
   in response to the identified target device not matching the model of the identified target device, performing actions including:
      recognizing at least one indicator of the target device in the captured environmental input,
      associating an error condition with the at least one indicator of the identified target device, and
      displaying the associated error condition and a troubleshooting instruction, based on the at least one indicator.

16. The method of claim 15, wherein the at least one indicator includes a power indicator light in the captured environmental input.

17. The method of claim 15, wherein the error condition includes a power failure of the identified target device.

18. The method of claim 15, further comprising, in response to the identified target device not matching the model of the identified target device, launching a repair interface for the computing systems.

19. The method of claim 15, further comprising, in response to the identified target device not matching the model of the identified target device, automatically querying a network regarding the error condition.

20. The method of claim 19, further comprising receiving at least one cause of error, at least one solution to the error condition, and the troubleshooting instruction in response to querying the network.

\* \* \* \* \*